United States Patent
Seo et al.

(10) Patent No.: US 11,420,162 B2
(45) Date of Patent: Aug. 23, 2022

(54) METHOD FOR PREPARING POROUS MEMBRANE OF FLUORINE-BASED RESIN

(71) Applicant: LG CHEM, LTD., Seoul (KR)

(72) Inventors: Joo Yeon Seo, Daejeon (KR); Sungjae Han, Daejeon (KR); Byeong In Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 153 days.

(21) Appl. No.: 16/651,618

(22) PCT Filed: Oct. 24, 2018

(86) PCT No.: PCT/KR2018/012659
§ 371 (c)(1),
(2) Date: Mar. 27, 2020

(87) PCT Pub. No.: WO2019/107746
PCT Pub. Date: Jun. 6, 2019

(65) Prior Publication Data
US 2020/0298184 A1   Sep. 24, 2020

(30) Foreign Application Priority Data

Nov. 28, 2017 (KR) .......... 10-2017-0160642
Oct. 23, 2018 (KR) .......... 10-2018-0126661

(51) Int. Cl.
| | |
|---|---|
| *B01D 53/22* | (2006.01) |
| *B01D 67/00* | (2006.01) |
| *B01D 71/36* | (2006.01) |
| *B01D 69/02* | (2006.01) |

(52) U.S. Cl.
CPC ....... *B01D 67/0027* (2013.01); *B01D 53/228* (2013.01); *B01D 67/0083* (2013.01); *B01D 69/02* (2013.01); *B01D 71/36* (2013.01); *B01D 2325/02* (2013.01); *B01D 2325/04* (2013.01)

(58) Field of Classification Search
CPC ................ B01D 69/02; B01D 67/0083; B01D 67/0027; B01D 53/228; B01D 2325/02; B01D 2325/04; B01D 71/36
See application file for complete search history.

(56) References Cited

U.S. PATENT DOCUMENTS

| | | | | |
|---|---|---|---|---|
| 4,197,148 A | * | 4/1980 | Shinomura | ............ B01D 71/26 156/79 |
| 4,290,987 A | * | 9/1981 | Soehngen | .............. B01D 71/72 264/41 |

(Continued)

FOREIGN PATENT DOCUMENTS

| | | |
|---|---|---|
| CN | 101512779 A | 8/2009 |
| CN | 103963307 A | 8/2014 |

(Continued)

OTHER PUBLICATIONS

Search Report & Written Opinion issued for International Application No. PCT/KR2018/012659 dated Apr. 18, 2019, 7 pages.

*Primary Examiner* — Anthony R Shumate
(74) *Attorney, Agent, or Firm* — Rothwell, Figg, Ernst & Manbeck, P.C.

(57) ABSTRACT

The present invention provides a method for preparing a porous membrane of a fluorine-based resin having an improved shrinkage while maintaining excellent filtration efficiency and air permeability.

15 Claims, 1 Drawing Sheet

(56) References Cited

U.S. PATENT DOCUMENTS

| | | | |
|---|---|---|---|
| 4,613,441 A * | 9/1986 | Kohno | H01M 50/40 210/500.36 |
| 5,814,405 A | 9/1998 | Branca et al. | |
| 6,284,565 B1 | 9/2001 | Tachibana et al. | |
| 6,582,496 B1 * | 6/2003 | Cheng | B01D 67/0018 95/46 |
| 6,710,098 B1 * | 3/2004 | Lee | B29C 59/16 522/161 |
| 10,084,292 B2 | 9/2018 | Kodani et al. | |
| 2003/0031924 A1 * | 2/2003 | Lee | H01M 50/403 429/142 |
| 2003/0104273 A1 * | 6/2003 | Lee | H01M 50/411 429/144 |
| 2004/0010062 A1 * | 1/2004 | Ahn | C08G 73/1042 524/238 |
| 2005/0230856 A1 * | 10/2005 | Parekh | B01D 19/0031 261/122.1 |
| 2009/0230585 A1 | 9/2009 | Thottupurathu | |
| 2009/0242026 A1 | 10/2009 | Miyaji et al. | |
| 2009/0269656 A1 * | 10/2009 | Takita | B01D 67/009 429/145 |
| 2011/0223486 A1 | 9/2011 | Zhang et al. | |
| 2011/0254186 A1 | 10/2011 | Brandimarte et al. | |
| 2012/0234745 A1 * | 9/2012 | Jerman | B29C 66/1122 210/321.8 |
| 2014/0231340 A1 * | 8/2014 | Gsell | B01D 67/0086 210/500.36 |
| 2014/0231341 A1 | 8/2014 | Sitterer et al. | |
| 2015/0353694 A1 | 12/2015 | Hayashi et al. | |
| 2016/0325235 A1 | 11/2016 | Uchiyama et al. | |
| 2017/0028362 A1 | 2/2017 | Stasiak et al. | |
| 2017/0266865 A1 | 9/2017 | Zhang et al. | |
| 2020/0298184 A1 * | 9/2020 | Seo | B01D 71/32 |

FOREIGN PATENT DOCUMENTS

| | | |
|---|---|---|
| CN | 104822442 A | 8/2015 |
| CN | 104884942 A | 9/2015 |
| CN | 107362699 A | 11/2017 |
| JP | H07-196831 A | 8/1995 |
| JP | 2005-314593 A | 11/2005 |
| JP | 3863183 B2 | 12/2006 |
| JP | 2011-178970 A | 9/2011 |
| JP | 2012-132120 A | 7/2012 |
| JP | 2015-009221 A | 1/2015 |
| JP | 2015-037097 A | 2/2015 |
| JP | 2017-071131 A | 4/2017 |
| KR | 10-2000-0071391 A | 11/2000 |
| KR | 10-2013-0039713 A | 4/2013 |
| KR | 10-2015-0079114 A | 7/2015 |
| KR | 10-2015-0126329 A | 11/2015 |
| KR | 10-2016-0026821 A | 3/2016 |
| KR | 10-1599111 B1 | 3/2016 |
| KR | 10-2016-0104714 A | 9/2016 |
| KR | 10-2017-0015138 A | 2/2017 |
| WO | 2006-058233 A1 | 6/2006 |

\* cited by examiner

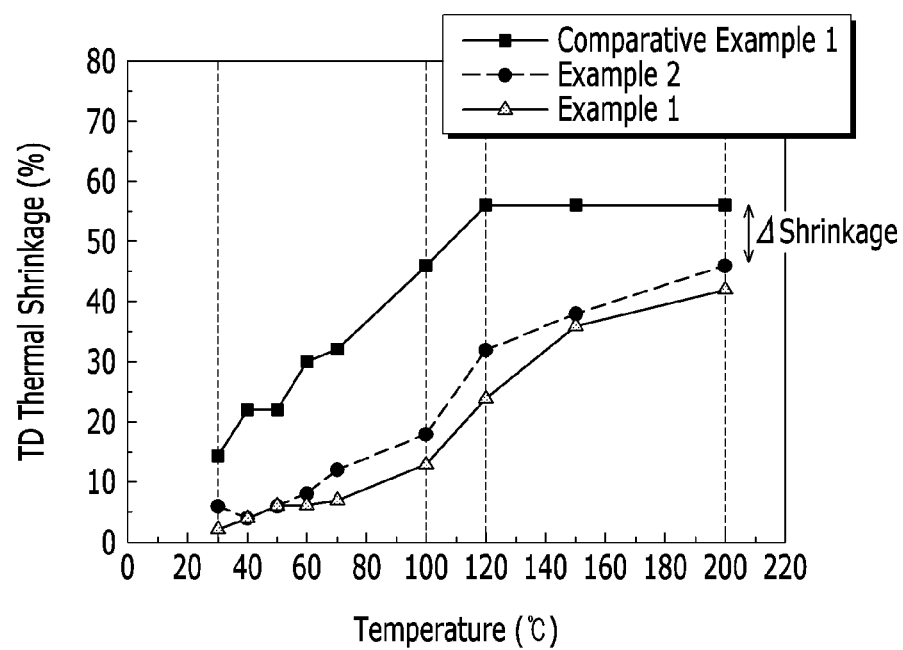

METHOD FOR PREPARING POROUS MEMBRANE OF FLUORINE-BASED RESIN

CROSS-REFERENCE TO RELATED APPLICATION(S)

This application is a 35 U.S.C. 371 National Phase Entry Application from PCT/KR2018/012659, filed on Oct. 24, 2018, designating the United States and which claims priority to and the benefit of Korean Patent Application No. 10-2017-0160642 filed in the Korean Intellectual Property Office on Nov. 28, 2017, and Korean Patent Application No. 10-2018-0126661 filed in the Korean Intellectual Property Office on Oct. 23, 2018, the entire contents of which are incorporated herein by reference.

TECHNICAL FIELD

The present invention relates to a method for preparing a porous membrane of a fluorine-based resin having an improved shrinkage while maintaining excellent filtration efficiency and air permeability.

BACKGROUND OF THE INVENTION

A porous membrane used in various fields is required to have both high filtration efficiency, and gas and liquid permeability. Therefore, it is known how to increase the amount of fluid passing through pores under specific pressure by uniformly controlling a pore diameter distribution inside the porous membrane.

The porous membrane of the fluorine-based resin may have properties such as high heat resistance, chemical stability, weatherability, nonflammability, strength, non-stickiness, low friction coefficient, or the like, which are caused by the fluorine-based resin itself. In addition, when the porous membrane of the fluorine-based resin as a porous body is manufactured, it may have properties such as flexibility, liquid permeability, particle capture efficiency, and low dielectric constant, or the like.

Particularly, among these fluorine-based resins, a porous membrane using polytetrafluoroethylene (PTFE) has high stability against various compounds, such that it has been widely used as a microfiltration filter (membrane filter) against a mixture of a gas and a liquid particularly in a semiconductor related field, a liquid crystal related field, and a food and medical related field.

The PTFE membrane is manufactured by forming a preform using a paste composed of a mixture of a PTFE powder and a lubricant, forming the preform into a sheet form by a rolling or extrusion process, followed by performing thermal-treatment to remove the lubricant, and then performing a uniaxial stretching in a transverse direction (TD) or a machine direction (MD), or performing a biaxial stretching in the MD and the TD.

As described above, a PTFE porous body produced by extruding and stretching the PTFE perform has a microstructure including a plurality of microfibrils and a plurality of nodes connected to each other by the microfibrils, and a porous structure having continuous porosity is formed by the microstructure.

However, when the PTFE membrane is manufactured by methods as described above, in processes such as extrusion, drying, and stretching, or the like, a pore shape and property may not be maintained due to high temperature and high pressure environments, and in particular, poor bubbles may be generated on a surface thereof. Accordingly, the manufactured porous PTFE membrane does not have sufficient strength and filtration performance. In addition, porosity of the PTFE membrane is controlled by stretching and sintering processes. In the case of stretching, porosity of a membrane may be easily secured, but, strength and pressure resistance in the transverse direction may be lowered, and shrinkage in a machine direction may be easily generated.

Therefore, the PTFE membrane has a problem that air permeability (or flow rate) is to be increased and dimensional stability is to be improved without decrease in the filter efficiency.

To solve the problem, a method of improving shrinkage by lowering a stretching ratio at the time for preparing the PTFE membrane has been proposed. However, it is necessary to increase the stretching ratio in order to manufacture a membrane having a small sized pore in consideration of the filter efficiency and application of the membrane. The method is therefore very limited.

As another method, a method of simultaneously applying a high temperature of 327° C. or more and pressure has been proposed. However, porosity and the pore size of the PTFE membrane are significantly decreased when the high temperature and the pressure are simultaneously applied.

BRIEF SUMMARY OF THE INVENTION

The present invention provides a method for preparing a porous membrane of a fluorine-based resin having advantages of improved shrinkage while maintaining excellent filtration efficiency and air permeability.

An exemplary embodiment of the present invention provides a method for preparing a porous membrane of a fluorine-based resin having a transverse direction shrinkage of 30% or less at 100° C. or less, including:

stretching a porous fluorine-based resin film in a machine direction (MD) and thermal-treating the porous fluorine-based resin film at a temperature equal to or more than 330° C. and less than 340° C. for 5 to 12 seconds; and stretching the thermal-treated porous fluorine-based resin film in a transverse direction (TD) and then sintering the stretched thermal-treated porous fluorine-based resin film at a temperature equal to or more than a melting point of the fluorine-based resin film.

DETAILED DESCRIPTION OF THE INVENTION

Hereinafter, the method for preparing a porous membrane of a fluorine-based resin according to an embodiment of the present invention and a porous membrane of a fluorine-based resin manufactured thereby and having improved shrinkage will be described in more detail.

Terms "a porous membrane of a fluorine-based resin" used herein refers to a membrane made of a fluorine-based resin, specifically, polytetrafluoroethylene (PTFE), and in particular, refers to a filtration membrane used for removing foreign matters, or the like.

In order to improve the shrinkage in the manufacture of a conventional porous membrane of a fluorine-based resin, a sintering process is performed after stretching, or semi-sintering is performed before stretching. However, such a sintering process has a problem in that it is difficult to obtain a sufficient shrinkage-improvement effect, and the pore size or porosity is changed to cause deterioration in permeability or filtration efficiency.

To solve the problem, in the present invention, a thermal-treatment is performed for a short time in the range where sintering does not occur during a stretching process, such that thermal shrinkage, particularly, shrinkage in a transverse direction at 100° C. or less is greatly improved, while maintaining excellent permeability and filtration efficiency without changing pore size or porosity.

Specifically, the method for preparing the porous membrane of the fluorine-based resin according to an exemplary embodiment of the present invention includes stretching a porous fluorine-based resin film in a machine direction (MD) and thermal-treating the porous fluorine-based resin film at a temperature equal to or more than 330° C. and less than 340° C. for 5 to 12 seconds (step 1); and stretching the thermal-treated porous fluorine-based resin film in a transverse direction and then sintering the stretched thermal-treated porous fluorine-based resin film at a temperature equal to or more than the melting point of the fluorine-based resin film (step 2), wherein the porous membrane of the fluorine-based resin manufactured according to the manufacturing method as described above has the transverse direction shrinkage of 30% or less at 100° C. or less.

Hereinafter, the present invention will be described in detail for each step.

Step 1 is a step of subjecting the porous fluorine-based resin film to a primary thermal-treatment after stretching the porous fluorine-based resin film in the machine direction (MD).

The porous fluorine-based resin film may be used without any particular limitation as long as it is generally used for manufacturing the porous membrane of the fluorine-based resin.

As an example, the porous fluorine-based resin film may be manufactured by extruding and rolling a fluorine-based resin-containing composition containing a fluorine-based resin and a lubricant; and thermal-treating the fluorine-based resin film to remove the lubricant. Therefore, the method for preparing the porous membrane of the fluorine-based resin according to an exemplary embodiment of the present invention may further include manufacturing the porous fluorine-based resin film as described above.

Specifically, the fluorine-based resin-containing composition may be produced by mixing the fluorine-based resin with the lubricant.

The fluorine-based resin may be used without limitation as long as it is generally used in a fluorine-based resin film. Specific examples thereof may include polytetrafluoroethylene (PTFE), tetrafluoroethylene-perfluoroalkyl vinyl ether copolymer (PFA), tetrafluoroethylene-hexafluoropropylene copolymer (FEP), ethylene-tetrafluoroethylene copolymer resin (ETFE), tetrafluoroethylene-chlorotrifluoroethylene copolymer (TFE/CTFE), or ethylene-chlorotrifluoroethylene resin (ECTFE), or the like, and any one or a mixture of two or more thereof may be used. Among them, in consideration of improvement in chemical resistance, heat resistance, and nonflammability of the porous membrane, a PTFE resin may be used.

In addition, the PTFE resin may be produced by conventional methods such as emulsion polymerization, or the like, and may be used in a powder form. In this case, in consideration of manufacturing efficacy thereof at the time of manufacturing the porous membrane of the fluorine-based resin, and an effect of improving physical properties of the porous membrane of the manufactured fluorine-based resin, the PTFE resin may be secondary particles in which a plurality of primary particles having an average particle size of 0.2 to 0.3·m are aggregated, and in this case, the secondary particles may have an average particle size of 400 to 700·m.

In addition, the PTFE resin may have a bulk density (weight per 1 L of resin) of 400 to 600 g/L under conditions where such a particle structure and a size range are satisfied.

In addition, the lubricant serves to facilitate the extrusion while wetting surface of a fluorine-based resin power. The lubricant may be used without any particular limitation as long as it may be removed by methods such as evaporation/extraction, or the like by heat after being formed in a sheet form. As specific examples, hydrocarbon oils such as liquid paraffin, naphtha, white oil, toluene, xylene, or the like, various alcohols, ketones, or esters, or the like may be used.

Meanwhile, when the porous membrane is manufactured through stretching against the fluorine-based resin film, microfibrils may be formed from fluorine-based resin particles under high temperature and high pressure conditions and fine pores may be formed by nodes in which the fibrils are connected to each other. The lubricant should be used at a minimum in order to firmly form a connection of the fibrils and a bonding between the fluorine-based resin particles and to manufacture a porous membrane having small sized pores. However, when the content of the lubricant relative to the resin is too small, the load on the preform surface is increased in the processes for manufacturing the preform, and for performing rolling and extrusion, or the like, whereby a surface-filming phenomenon in which surface pores are clogged and a smooth surface is formed may occur. When the surface-filming phenomenon occurs, since the pores disappear on the surface, the lubricant is not discharged to the outside in a drying process. The lubricant which has not been discharged to the outside is then vaporized by high temperature in a process such as stretching, or the like, causing defects such as peeling in the inside of the membrane or exciting the inside of the sample.

Therefore, in the present invention, the lubricant may be used in an amount of 10 to 30 parts by weight, and more specifically, 15 to 30 parts by weight, based on 100 parts by weight of the fluorine-based resin.

After mixing the fluorine-based resin with the lubricant, an aging process for a predetermined time may be further selectively performed for uniform mixing of each component in the mixture.

The aging may be specifically performed by maintaining the mixture of the fluorine-based resin and the lubricant at a temperature of 15 to 50° C., and more specifically, at room temperature (23±5° C.) for 12 to 24 hours.

In addition, after the mixing process, or after completion of the aging process following the mixing process, but before extrusion process, a process of forming the preform by applying pressure to the mixture may be further selectively performed.

A process of forming the preform may be specifically performed by applying pressure of 1 to 5 MPa to the mixture or an aged mixture.

Then, a process of manufacturing the fluorine-based resin film is performed by extruding and rolling the mixture obtained by the process as described above.

In this case, the fluorine-based resin film manufactured after extrusion may have a thickness of about 3000·m, and the fluorine-based resin film after rolling may have a thickness of 80 to 600·m.

When the fluorine-based resin film has the thickness range as described above, the porous membrane of the fluorine-based resin may have more excellent effects.

The extrusion and rolling processes may be performed according to conventional methods, except that the fluorine-based resin film to be manufactured to have the thickness of the range as described above.

Specifically, the extrusion process may be performed at a temperature of 25 to 50° C. and a pressure of 1 to 40 MPa, and the rolling process may be performed at a temperature of 30 to 100° C. and a pressure of 10 to 30 MPa.

In addition, the rolling process may be performed once, or twice or more in consideration of a thickness of the fluorine-based resin film as described above. As an example, in a case of performing the rolling process twice, the mixture may be primarily extruded in a sheet shape having a thickness of 1 to 3 mm, and then secondarily extruded in a sheet shape having a thickness of 80 to 600·m.

Then, the manufactured fluorine-based resin film is thermal-treated to remove the lubricant.

A thermal-treatment temperature is not particularly limited as long as it is a temperature at which the lubricant may be removed. Specifically, the thermal-treatment may be performed at a temperature of 120 to 200° C., and more specifically, at 150 to 200° C. for a period of time in which the lubricant may be completely removed.

Then, the manufactured porous fluorine-based resin film is stretched in the machine direction.

The stretching process may be performed between rolls rotating at different speeds or may be performed in an oven using a tenter.

Specifically, the stretching process may be performed by stretching the fluorine-based resin film in the machine direction at a stretching ratio of 2 to 20 times, and more specifically, 3 to 15 times. When the stretching process in the machine direction is performed under the conditions as described above, the length of the fibrils may be prevented from being shortened, and as a result, a mean pore size may be increased to obtain high air permeability.

In addition, the stretching process may be performed at a temperature equal to or lower than the melting point of the fluorine-based resin film, more specifically, at a temperature of 100 to 320° C., and more specifically 200 to 300° C.

When the stretching process is performed in the temperature range as described above, it is advantageous to form a porous structure. After the stretching process in the machine direction, the stretched fluorine-based resin film is thermal-treated at a temperature equal to or more than 330° C. and less than 340° C. for 5 to 12 seconds, the temperature being equal to or more than the melting point of the stretched fluorine-based resin film and lower than a sintering temperature thereof.

A change in crystallinity may be determined by measuring a heat capacity value ($\Delta H$) by differential scanning calorimetry (DSC) for the fluorine-based resin film stretched in the MD direction and thermal-treated. In addition, through the change in crystallinity, a degree of a plasticity of the fluorine-based resin film may be determined. In the present invention, the melting point of the fluorine-based resin film measured by DSC was about 327 to 333° C., and the temperature that did not affect a plasticity of the fluorine-based film was less than 340° C. Therefore, the fluorine-based resin film may be thermal-treated at a temperature equal to or more than 330° C. and less than 340° C. for 5 to 12 seconds.

The fluorine-based resin film made be porous by being stretched in the machine direction has poor dimensional stability and shrinkage possibility even at room temperature. Such shrinkage may be prevented by thermal-fixing the fluorine-based resin film through the primary thermal-treatment under the conditions as described above. When the thermal-treatment temperature is less than 330° C. or the thermal-treatment time is less than 5 seconds, a sufficient thermal-fixing effect cannot be obtained. Meanwhile, when the thermal-treatment temperature is 340° C. or more or the thermal-treatment time is more than 12 seconds, fibril strands in the fluorine-based film are aggregated and thickened, and at the same time, the pore size is increased, whereby physical properties of the fluorine-based resin film are changed and fracture is easily generated in TD stretching. More specifically, the thermal-treatment may be performed at 334 to 339° C. for 5 to 10 seconds. In this case, it is possible to manufacture the fluorine-based resin film having an improved shrinkage, while maintaining excellent physical properties, due to the optimization in the conditions of the thermal-treatment temperature and the thermal-treatment time.

Step 2 is a step of manufacturing a porous membrane of a fluorine-based resin by stretching the fluorine-based resin film thermal-treated in step 1 in the transverse direction and sintering the fluorine-based resin film at a temperature equal to or higher than the melting point of the fluorine-based resin film.

Specifically, in step 2, the stretching process in a transverse direction may be performed by stretching the fluorine-based resin film in the transverse direction at a stretching ratio of 2 to 50 times, more specifically, 10 to 30 times. In addition, the stretching process in the transverse direction may be performed at a temperature near or equal to or lower than the melting point of the fluorine-based resin film, more specifically, 100 to 400° C., and more specifically, 100 to 350° C. or 100 to 300° C. A shrinkage resistance in the transverse direction may be improved by increasing porosity while reducing the mean pore size during the stretching process in the transverse direction under the conditions as described above.

The stretching process in the transverse direction may be performed between rolls rotating at different speeds or may be performed in an oven using a tenter.

Then, the sintering treatment is performed at a temperature equal to or more than the melting point of the fluorine-based resin film stretched in the transverse direction.

Specifically, the sintering process is for preventing a thermal shrinkage of the porous membrane of the fluorine-based film finally manufactured by thermal-fixing the stretched fluorine-based resin film. The sintering process may be performed at a temperature of 350 to 450° C., and more specifically, 360 to 380° C., for 9 to 100 seconds, and more specifically 10 to 30 seconds. The pore distribution in the porous membrane of the fluorine-based resin finally manufactured may be narrowed by the sintering treatment under these conditions.

The sintering process may be performed according to a conventional method, and particularly, may be performed in an oven using a tenter.

In the porous membrane of the fluorine-based resin manufactured by the manufacturing method as described above, the thermal shrinkage, particularly the thermal shrinkage at 100° C. or less may be greatly improved by thermal-fixing the fluorine-based resin film stretched through the thermal-treatment performed for each of the stretching process.

In addition, the porous membrane of the fluorine-based resin manufactured by the manufacturing method as described above may be performed under a control condition in which the generation of sintering is prevented at the time of the thermal-treatment, whereby the change in pore size and porosity in the fluorine-based resin film may be prevented. Therefore, the porous membrane may maintain high porosity while having fine pore size, such that the amount of the fluid passing through the porous membrane per unit time under a predetermined pressure is also relatively high. As a result, filtration efficiency and permeability may be improved in a balanced manner.

In addition, in the conventional porous membrane having a fine thickness, a membrane shape or a pore diameter distributed therein may be changed by the applied pressure at the time of filtration, and the membrane itself may be ruptured, such that filtration properties of the porous membrane may be significantly deteriorated. However, the porous membrane of the fluorine-based resin manufactured according to the manufacturing method as described above has not only excellent mechanical properties, but also properties in which the membrane shape, or the shape of internal pores, or the like is not significantly changed, even during the manufacturing process and the filtration operation process.

Therefore, according to another exemplary embodiment of the present invention, there is provided the porous membrane of the fluorine-based resin manufactured by the manufacturing method as described above and having an excellent shrinkage.

Specifically, the porous membrane of the fluorine-based resin manufactured by the manufacturing method has the transverse direction shrinkage of 30% or less, and more specifically, 25% or less at 100° C. or less. As described above, the porous membrane of the fluorine-based resin has a low shrinkage at 100° C. or less, and thus may exhibit excellent shape stability.

In the present invention, the transverse direction shrinkage of the porous membrane of the fluorine-based resin may be calculated according to the following Equation 1 by using a measured value of a dimension changed when the porous membrane of the fluorine-based resin is cut at a predetermined length and is then left in a free-standing state at a predetermined thermal-treatment temperature for a predetermined time.

$$TD \text{ thermal shrinkage } (\%) = 100\% \times \frac{(TD \text{ length before thermal treatment} - TD \text{ length after thermal treatment})}{TD \text{ length before thermal treatment}}$$ [Equation 1]

As an example, when the porous membrane of the fluorine-based resin for measuring the transverse direction shrinkage is cut at 5 cm in the machine direction and 5 cm in the transverse direction, a length in a transverse direction before the thermal-treatment is 5 cm. In addition, the length in the transverse direction after the thermal-treatment is the length in the transverse direction of the porous membrane of the fluorine-based resin measured after the porous membrane of the fluorine-based resin is left in a free standing state at a predetermined temperature for a predetermined time, specifically, for 30 minutes. As an example, when the thermal-treatment is performed in a manner that the porous membrane of the fluorine-based resin is placed in an oven at a temperature of 100° C. and left it in a free-standing state for 30 minutes, the length in the transverse direction after the thermal-treatment is the length in the transverse direction of the porous membrane of the fluorine-based resin after being maintained at a temperature of 100° C. for 30 minutes.

In addition, the porous membrane of the fluorine-based resin has shrinkage of 50% or less at 120 to 200° C., and also has excellent shape stability at a high temperature. The porous membrane of the fluorine-based resin has the transverse direction shrinkage equal to or less than 50% at 120 to 200° C. Therefore, when the porous membrane of the fluorine-based resin is applied to a product, shape stability may be maintained even under the condition in which it is in contact with high temperature sulfuric acid, or the like.

In addition, the porous membrane of the fluorine-based resin manufactured by the manufacturing method as described above has high linearity of the fibrils constituting the membrane, such that the diameter distribution of the pores distributed therein is precise and uniform, and the amount of the fluid passing through the porous membrane per unit time under a predetermined pressure is also relatively high.

In addition, in the porous membrane having a fine thickness, a membrane shape or a pore diameter distributed therein may be changed by the applied pressure at the time of filtration, and the membrane itself may be ruptured, such that filtration properties of the porous membrane may be significantly deteriorated. However, the porous membrane of the fluorine-based resin manufactured according to the manufacturing method as described above has not only excellent mechanical properties, but also properties in which the membrane shape, or the shape of internal pores, or the like is not significantly changed greatly, even during the manufacturing process and filtration operation process. Particularly, the porous membrane of the present invention may exhibit better dimensional stability, as compared with other porous membranes having the same porosity and pore size distribution.

Specifically, the pore included in the porous membrane of the fluorine-based resin may have a mean pore size of 50 to 2000 nm, and more specifically, 100 to 450 nm. The porous membrane of the fluorine-based resin having the above-described pore size range may exhibit excellent filtration efficiency without deterioration in permeability. The shrinkage at 120 to 200° C. may also be determined according to Equation 1 above.

In addition, the porous membrane of the fluorine-based resin may have a bubble point of 1 to 49 psi, and more specifically 10 to 35 psi.

In the present invention, the bubble point (psi) refers to a pressure at the beginning of a wetting curve in a capillary flow porosimeter, and reflects the maximum pore size in the porous membrane of the fluorine-based resin. Specifically, when a membrane sample is wetted in a solution to fill the pores with the solution, and an air is blown while increasing pressure, the solution filled in a large pore is first moved by pressure, and the pressure at this time is referred to as a bubble point pressure.

When the porous membrane of the fluorine-based resin according to an exemplary embodiment of the present invention exhibits a bubble point pressure (psi) within the range as described above in the wetting and drying curve of a capillary flow pore measuring instrument, the pore size is variously distributed, such that air permeability is good and wettability and strength are excellent.

In the present invention, the mean pore size and bubble point in the porous membrane of the fluorine-based resin may be measured using a measuring device such as a Capillary Flow Porometer instrument manufactured by PMI Co. according to a conventional measuring method, and specifically may be measured by methods as described in the following experimental examples.

In addition, the porous membrane of the fluorine-based resin has porosity of 70 to 90%, and more specifically, 80 to 90%. As described above, as porosity is increased while having a small mean pore size, permeability may be significantly improved.

Meanwhile, in the present invention, porosity of the porous membrane of the fluorine-based resin may be determined according to the following Equation 2 after density is calculated from volume and weight of the porous membrane. In this case, the weight, thickness, area, or the like of the porous membrane may be measured by the methods as described in experimental examples below:

$$\text{Porosity (\%)} = \{1-(\text{weight [g]}/(\text{thickness [cm]} \times \text{area [cm}^2\text{]} \times \text{true density [g/cm}^3\text{]}))\} \times 100\% \quad [\text{Equation 2}]$$

wherein the true density was 2.2 g/cm$^3$, which was the true density of the fluorine-based resin.

In addition, the porous membrane of the fluorine-based resin has a thickness of 5 to 100 μm, more specifically, 10 to 90 μm, and still more specifically, 10 to 50 μm. When the thickness range is satisfied together with the pore conditions, filtration efficiency, permeability, and dimensional stability may be excellent in a balanced manner. Specifically, as shown in the experimental examples below, when the porous membrane of the fluorine-based resin was left in a free standing state at room temperature and atmospheric pressure (23±5° C., 1±0.2 atm) for 67 hours, the porous membrane of the fluorine-based resin may exhibit excellent dimensional stability of 10% or less, more specifically, 5% or less, and more specifically, 2 to 4%.

Therefore, the porous membrane of the fluorine-based resin may be widely used as filter media for corrosive gases and liquids, permeable membranes for electrolysis and battery separators, and may also be used to microfiltrate various gases and liquids used in the semiconductor industry.

Another exemplary embodiment of the present invention provides a filter and a filter device that include the porous membrane of the fluorine-based resin as described above.

The filter may further include a filter element such as a nonwoven fabric, a fabric, a mesh or a screen, in addition to the porous membrane of the fluorine-based resin as described above, and may have various shapes such as a flat plate shape, a corrugated shape, a spiral shape, or a hollow cylindrical shape, and the like.

Advantageous Effects

The porous membrane of the fluorine-based resin according to the present invention may exhibit improved shrinkage while maintaining excellent filtration efficiency and air permeability.

DESCRIPTION OF THE DRAWINGS

FIG. 1 shows results of evaluating thermal shrinkage of the porous membranes of a fluorine-based resin manufactured in Examples 1 and 2, and Comparative Example 1.

DETAILED DESCRIPTION OF EMBODIMENTS

Hereinafter, preferred examples will be presented in order to assist in the understanding of the present invention. However, the following examples are provided only in order to easily understand the present invention, and a content of the present invention is not limited thereto.

Example 1

22 parts by weight of Isopar H™ (manufactured by ExxonMobil) as a lubricant was mixed with 100 parts by weight of PTFE resin F106C™ (manufactured by Dakin) to prepare a fluorine-based resin-containing composition, and then the composition was aged at room temperature for 24 hours. Then, a pressure of 4 MPa was applied to the composition to prepare a preform block, and the preform block was extruded into a sheet form using a paste extruding device, and then rolled to have a thickness of 500 μm using a rolling roll to manufacture a PTFE film.

The manufactured PTFE film was thermal-treated in a heating oven at 200° C. through a roll-to-roll process to completely remove the lubricant, stretched 6 times in the machine direction using roll speed difference at 300° C., and then thermal-treated at 335° C. for 9 seconds. The PTFE film thermal-treated and stretched in the machine direction was stretched 15 times in the transverse direction using a tenter at 300° C., and sintered using the tenter at 380° C. for 13 seconds to manufacture a porous PTFE membrane (thickness: 25 μm).

Example 2

22 parts by weight of Isopar H™ (manufactured by ExxonMobil) as a lubricant was mixed with 100 parts by weight of PTFE resin F106C™ (manufactured by Dakin) to prepare a fluorine-based resin-containing composition, and then the composition was aged at room temperature for 24 hours. Then, a pressure of 4 MPa was applied to the composition to prepare a preform block, and the preform block was extruded into a sheet form using a paste extruding device, and then rolled to have a thickness of 500 μm using a rolling roll to manufacture a PTFE film. The manufactured PTFE film was thermal-treated in a heating oven at 200° C. through a roll-to-roll process to completely remove the lubricant, stretched 3 times in the machine direction using roll speed difference at 300° C., and then thermal-treated at 335° C. for 9 seconds. The PTFE film thermal-treated and stretched in the machine direction was stretched 20 times in the transverse direction using a tenter at 300° C., and sintered using the tenter at 380° C. for 13 seconds to manufacture a porous PTFE membrane (thickness: 30 μm).

Comparative Example 1

A porous PTFE membrane was manufactured in the same manner as in Example 1, except that the stretched PTFE film was not subjected to a thermal-treatment process after being stretched in the machine direction in Example 1.

Specifically, 22 parts by weight of Isopar H™ (manufactured by ExxonMobil) as a lubricant was mixed with 100 parts by weight of PTFE resin F106C™ (manufactured by Dakin) to prepare a fluorine-based resin-containing composition, and then the composition was aged at room temperature for 24 hours. Then, a pressure of 4 MPa was applied to the composition to prepare a preform block, and the preform block was extruded into a sheet form using a paste extruding device, and then rolled to have a thickness of 500 μm using a rolling roll to manufacture a PTFE film.

The manufactured PTFE film was thermal-treated process in a heating oven of at 200° C. through a roll-to-roll process to completely remove the lubricant, and stretched 6 times in the machine direction using roll speed difference at 300° C. The resulting stretched PTFE film in the machine direction was stretched 15 times in the transverse direction using a tenter at 300° C., and sintered using the tenter at 380° C. for 13 seconds to manufacture a porous PTFE membrane (thickness: 25 μm).

Comparative Example 2

22 parts by weight of Isopar H™ (manufactured by ExxonMobil) as a lubricant was mixed with 100 parts by weight of PTFE resin F106C™ (manufactured by Dakin) to prepare a fluorine-based resin-containing composition, and then the composition was aged at room temperature for 24 hours. Then, a pressure of 4 MPa was applied to the composition to prepare a preform block, and the preform block was extruded into a sheet form using a paste extruding device, and then rolled to have a thickness of 500 µm using a rolling roll to manufacture a PTFE film.

The manufactured PTFE film was thermal-treated in a heating oven at 200° C. through a roll-to-roll process to completely remove the lubricant, stretched 6 times in the machine direction using roll speed difference at 300° C., and then thermal-treated at 340° C. for 9 seconds. The PTFE film thermal-treated and stretched in the machine direction was stretched in the transverse direction using the tenter at 300° C. However, the strength of the PTFE film was excessively increased due to high temperature at the time of thermal-treatment, such that the PTFE film was not stretched during the stretching in the transverse direction but was fractured.

Comparative Example 3

22 parts by weight of Isopar H™ (manufactured by ExxonMobil) as a lubricant was mixed with 100 parts by weight of PTFE resin F106C™ (manufactured by Dakin) to prepare a fluorine-based resin-containing composition, and then the composition was aged at room temperature for 24 hours. Then, a pressure of 4 MPa was applied to the composition to prepare a preform block, and the preform block was extruded into a sheet form using a paste extruding device, and then rolled to have a thickness of 500 µm using a rolling roll to manufacture a PTFE film.

The manufactured PTFE film was thermal-treated in a heating oven at 200° C. through a roll-to-roll process to completely remove the lubricant, stretched 6 times in the machine direction using roll speed difference at 300° C., and then thermal-treated at 300° C. for 9 seconds. The PTFE film thermal-treated and stretched in the machine direction was stretched 15 times in the transverse direction using a tenter at 300° C., and sintered at 380° C. for 13 seconds using the tenter to manufacture a porous PTFE membrane (thickness: 30 µm).

Comparative Example 4

A porous PTFE membrane was manufactured in the same manner as in Example 1, except that the porous fluorine-based resin film was subjected to a thermal-treatment process for 4 seconds after being stretched in the machine direction.

Comparative Example 5

The same manner was performed as in Example 1, except that the porous fluorine-based resin film was subjected to a thermal-treatment process at 335° C., which is a temperature equal to or more than the melting point of the PTFE, for 10 minutes, after being stretched in the machine direction. Thereafter, the thermal-treated PTFE film was subjected to the stretching process in the transverse direction, but fracture occurred during the stretching process, such that it was impossible to manufacture a porous PTFE film.

Experimental Example 1

Thermal shrinkage and a change in shrinkage of the porous membranes of the fluorine-based resin manufactured in Examples 1 and 2, and Comparative Example 1 depending on temperature were measured. The results are shown in FIG. 1.

Specifically, it was measured the dimensions changed when the porous membranes of the fluorine-based resin manufactured in Examples 1 and 2, and Comparative Example 1 were cut at 5 cm in the machine direction and at 5 cm in the transverse direction, placed in ovens each maintaining each temperature of 30° C., 40° C., 50° C., 60° C., 70° C., 100° C., 120° C., 150° C. and 200° C. and then left in a free standing state for 30 minutes. The TD thermal shrinkage was calculated according to the following Equation 1 using the measured results.

$$TD \text{ thermal shrinkage } (\%) = 100\% \times \frac{(TD \text{ length before thermal treatment} - TD \text{ length after thermal treatment})}{TD \text{ length before thermal treatment}} \quad [\text{Equation 1}]$$

wherein the transverse length before thermal-treatment is 5 cm.

As a result of the experiments, the porous PTFE membrane of Comparative Example 1 in which the thermal-treatment was not performed between the stretching process in the machine direction and the stretching process in the transverse direction had the transverse direction shrinkage of greater than 50% at 100° C. or less. However, the porous PTFE membranes of Examples 1 and 2 had the transverse direction shrinkage of 30% or less, and specifically 25% or less at 100° C. or less. In addition, the transverse direction shrinkage of the porous PTFE membrane was greatly increased at 100° C. or more. However, the porous PTFE membranes of Examples 1 and 2 still exhibited a low transverse direction shrinkage, and specifically, the transverse direction shrinkage of 50% or less at 120 to 200° C., as compared with the porous PTFE membrane of Comparative Example 1. From this, it may be appreciated that the thermal shrinkage of the porous PTFE membrane can be greatly improved at the time of manufacturing thereof according to the present invention.

In addition, a change in the shrinkage (ΔShrinkage) was calculated according to the following Equation 3:

ΔShrinkage=(Shrinkage of Comparative Example 1)$_{T1}$−(Shrinkage of Example 1 or 2)$_{T1}$     [Equation 3]

As a result, as shown in FIG. 1, the porous PTFE membranes of Examples 1 and 2 exhibited a large difference in the shrinkage from Comparative Example 1, and the shrinkage was increased at a relatively constant slope up to 100° C. Slopes of the shrinkage for the porous PTFE membranes of Examples 1 and 2, and Comparative Example 1 were increased in the range of 100 to 120° C., but the porous PTFE membranes of Examples 1 and 2 exhibited the greater slope of the shrinkage than that of Comparative Example 1.

Although absolute values of the shrinkage in the porous PTFE membranes of Examples 1 and 2, and Comparative Example 1 were different, differences between the absolute values tended to increase as a temperature increases. A thermal-treated sample had better thermal stability at temperature of 100° C. or less.

Experimental Example 2

The porous PTFE membranes manufactured in the Examples and the Comparative Examples were evaluated by methods below, and the results were shown in the following Table 1.

1) Mean pore size (nm) and bubble point (psi): The mean pore size and the bubble point were measured using a Capillary Flow Porometer instrument manufactured by PMI Co. Ltd.

Specifically, the porous PTFE membrane was mounted on the measurement instrument, and then completely wetted in a surface tension test solution (GALWICK™), and air or nitrogen was vertically injected into the porous membrane. When a pressure increases constantly and then reaches a specific pressure, drops of a test solution filling the largest hole in the pores burst. The pressure at this time was referred to as a bubble point.

Then, when a pressure increases continuously, the solution filling all of remaining small pores which have not burst, will also burst into drops. In this case, pore sizes were calculated by recording a flow rate (wet curve) according to pressure. In a porous membrane in a dry state in which it is not wetted in the test solution, a flow rate increases constantly as a pressure increases (dry curve). In this case, a pore corresponding to the pressure at the point where a graph in which the dry curve is ½ intersects with a wet curve is defined as a mean pore size.

2) Porosity: The weight, thickness, and area of the porous PTFE membrane were measured, respectively, and porosity was measured according to the following Equation 2. In this case, the thickness of the porous PTFE membrane was measured using a dial thickness gauge manufactured by Mitsutoyo Co. Ltd.

$$\text{Porosity (\%)} = \{1 - (\text{weight [g]}/(\text{thickness [cm]} \times \text{area [cm}^2\text{]} \times \text{true density [g/cm}^3\text{]}))\} \times 100\% \quad \text{[Equation 2]}$$

wherein the true density was 2.2 g/cm³, which was the true density of the fluorine-based resin.

3) Dimensional stability: The dimensional stability was measured according to the following Equation 4 by using a measured value of dimension changed when the porous membrane of the fluorine-based resin was cut at 5 cm in the machine direction and at 5 cm in the transverse direction, and left in a free standing state under room temperature and atmospheric pressure (23±5° C., 1±0.2 atm) conditions for 67 hours. The smaller the numerical value, the better dimensional stability.

$$\text{Dimensional stability (\%)} = 100\% \times \frac{(\text{Transverse direction length before experiment} - \text{Transverse direction length after 67 hours under room temperature and atmospheric pressure conditions})}{\text{Transverse direction length before experiment}} \quad \text{[Equation 4]}$$

wherein the length in the transverse direction before experiment is 5 cm.

As a result of experiments, the porous membrane of the fluorine-based resin of Examples 1 and 2 having a low transverse direction shrinkage of 30% or less at 100° C. or less exhibited remarkably improved dimensional stability at room temperature, as compared with the porous membrane of the fluorine-based resin of Comparative Examples 1, 3 and 4 having equivalent levels at porosity and the pore size.

The invention claimed is:

1. A method for preparing a porous membrane of a fluorine-based resin, comprising:
    stretching a fluorine-based resin film in a machine direction to prepare a porous fluorine-based resin film;
    thermal-treating the stretched porous fluorine-based resin film at a temperature equal to or more than 330° C. and less than 340° C. for 5 to 12 seconds; and
    stretching the thermal-treated porous fluorine-based resin film in a transverse direction; and then
    sintering the stretched thermal-treated porous fluorine-based resin film at a temperature equal to or more than a melting point of the fluorine-based resin film,
    wherein the sintering is performed at a temperature of 360 to 380° C. for 9 to 100 seconds, and the porous membrane of a fluorine-based resin has a transverse direction shrinkage of 30% or less at 100° C. or less and a mean pore size of 100 to 2000 nm.

2. The method of claim 1, wherein the stretching in the machine direction is performed at a stretching ratio of 2 to 20 times at a temperature of 100 to 320° C.

3. The method of claim 1, wherein the stretching in the transverse direction is performed at a stretching ratio of 2 to 50 times at a temperature of 100 to 400° C.

4. The method of claim 1, wherein the fluorine-based resin includes at least one selected from polytetrafluoroethylene, tetrafluoroethylene-perfluoroalkyl vinyl ether copolymer, tetrafluoroethylene-hexafluoropropylene copolymer, ethylene-tetrafluoroethylene copolymer resin, tetrafluoroethylene-chlorotrifluoroethylene copolymer, and ethylene-chlorotrifluoroethylene resin.

5. The method of claim 1, wherein the fluorine-based resin includes polytetrafluoroethylene.

6. The method of claim 1, wherein the fluorine-based resin film is prepared by extruding and rolling a fluorine-based resin-containing composition containing the fluorine-based resin and a lubricant; and removing the lubricant.

7. The method of claim 6, wherein the lubricant includes at least one selected from hydrocarbon oils, alcohols, ketones and esters.

8. The method of claim 6, wherein the lubricant includes at least one selected from liquid paraffin, naphtha, white oil, toluene, and xylene.

TABLE 1

|  | Example 1 | Example 2 | Comparative Example 1 | Comparative Example 2* | Comparative Example 3 | Comparative Example 4 | Comparative Example 5* |
|---|---|---|---|---|---|---|---|
| Mean pore size (nm) | 200 | 190 | 190 | Not measurable | 200 | 200 | Not measurable |
| Bubble point (psi) | 18 | 22 | 22 | Not measurable | 16 | 18 | Not measurable |
| Porosity (%) | 86 | 87 | 88 | Not measurable | 88 | 86 | Not measurable |
| Dimensional stability (%) | 2 | 4 | 17 | Not measurable | 14 | 16 | Not measurable |

*For Comparative Examples 2 and 5, the porous membrane was fractured during the stretching in the transverse direction, such that it was impossible to evaluate the mean pore size, bubble point, fibril length, porosity and dimensional stability.

9. The method of claim 6, wherein the fluorine-based resin-containing composition includes 10 to 30 parts by weight of the lubricant, based on 100 parts by weight of the fluorine-based resin.

10. The method of claim 6, wherein the removing of the lubricant is performed by thermal-treating the fluorine-based resin film at 120 to 200° C.

11. The method of claim 1, wherein the porous membrane of the fluorine-based resin further has a transverse direction shrinkage equal to or less than 50% at 120 to 200° C.

12. A porous membrane of a fluorine-based resin prepared by the method of claim 1.

13. The method of claim 1, wherein the porous membrane of the fluorine-based resin has a thickness of 5 to 100 μm.

14. The method of claim 1, wherein the porous membrane of the fluorine-based resin has a porosity of 70 to 90%.

15. The method of claim 1, wherein the porous membrane of the fluorine-based resin has a dimensional stability of 10% or less.

* * * * *